United States Patent [19]

Nakayama et al.

[11] Patent Number: 4,755,878
[45] Date of Patent: Jul. 5, 1988

[54] IMAGE INFORMATION TRANSMITTING SYSTEM

[75] Inventors: Tadayoshi Nakayama, Yokohama; Chikara Sato; Kenichi Nagasawa, both of Kawasaki; Tomohiko Sasatani; Koji Takahashi, both of Yokohama; Susumu Kozuki, Tokyo; Katsuji Yoshimura, Kawasaki, all of Japan

[73] Assignee: Canon Kabushiki Kaisha, Tokyo, Japan

[21] Appl. No.: 932,773

[22] Filed: Nov. 19, 1986

[30] Foreign Application Priority Data

Nov. 22, 1985 [JP] Japan .................. 60-263082

[51] Int. Cl.$^4$ ............................................ H04N 7/137
[52] U.S. Cl. .................................... 358/136; 375/27
[58] Field of Search ............... 358/136, 135, 133, 138; 375/27, 31, 33

[56] References Cited

U.S. PATENT DOCUMENTS 4,597,010 6/1986 Carr .................................... 358/136
4,598,411 7/1986 Berkovich .............................. 375/27
4,633,312 12/1986 Yasuda ................................. 375/33

Primary Examiner—Howard W. Britton
Attorney, Agent, or Firm—Robin, Blecker & Daley

[57] ABSTRACT

A system for transmitting an image information signal which continuously forms a temporally correlated group of image planes is arranged to divide each image plane portion of the image information signal into a plurality of blocks; to have a plurality of different information transmitting modes of transmitting the image information signal in different degrees of information density including a mode in which a present image plane portion of the image information signal is not transmitted; to form a transmitting information signal on the basis of applicable one of the plurality of the different information transmitting modes; to generate for each of the blocks a transmitting mode signal including information indicating use or nonuse of the information transmitting mode in which the present image plane portion of the image information signal is not transmitted; and to transmit the transmitting information signal and the transmitting mode signal in a multiplexing manner.

13 Claims, 5 Drawing Sheets

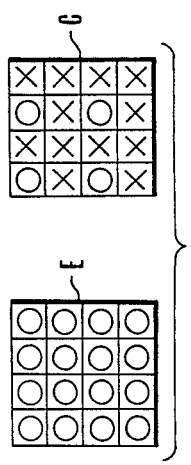
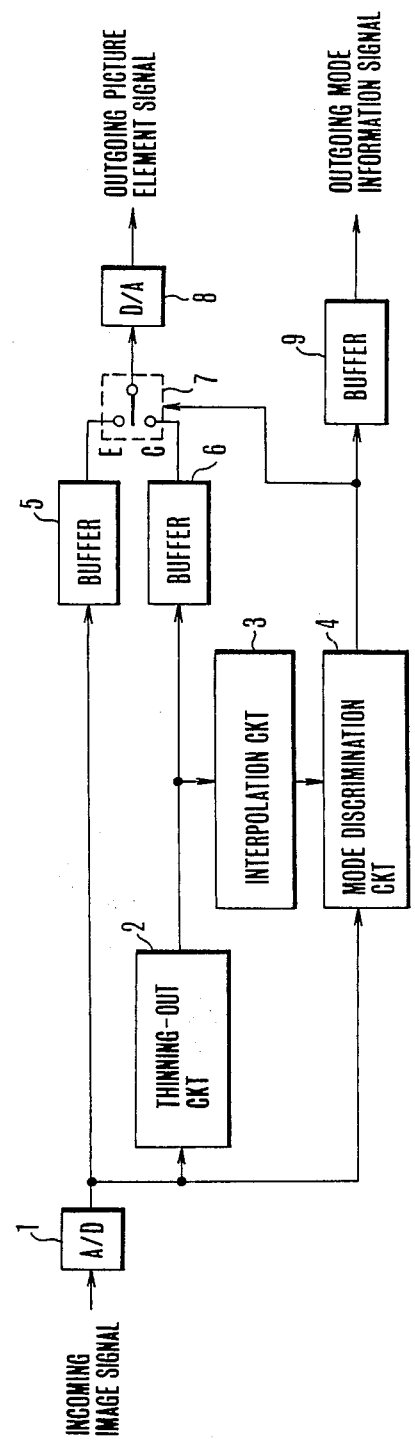
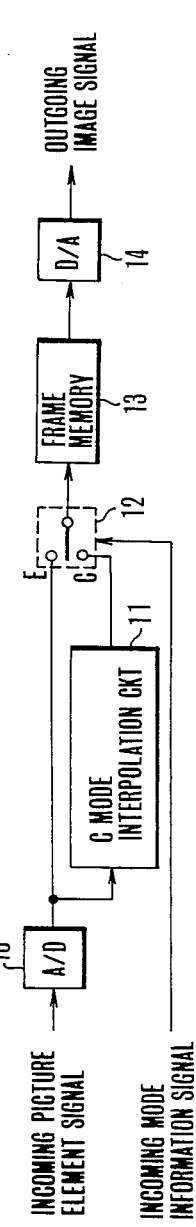
FIG.2 PRIOR ART
FIG.3 PRIOR ART
FIG.4 PRIOR ART

IMAGE INFORMATION TRANSMITTING SYSTEM

BACKGROUND OF THE INVENTION

1. Field of the Invention

This invention relates to an image information transmitting system and more particularly to a system for continuously transmitting a temporally correlated group of image planes.

2. Description of the Related Art

In transmitting information such as image information, it is always the theme of efforts to reproduce the original information with a higher degree of fidelity with a smaller amount of transmitting information. Hence, varied kinds of transmission methods have been proposed for this purpose.

These methods include adaptive type variable density sampling methods of appropriately changing sampling density, that is, varying the density of information being transmitted. An example of this method has been disclosed and known by the name of a time axis transforming band compressing method (hereinafter referred to as TAT method). The TAT method is briefly described below:

FIG. 1 of the accompanying drawings shows the fundamental concept of the TAT method. An original signal is divided as indicated by broken lines into blocks by a predetermined period of time. The information contained in the original signal within each divided block is checked to discriminate its degree of density. When any of the blocks is thus found to be dense, data obtained by sampling the original signal of the block is completely transmitted as transmitted data. For a block determined to be sparse, only a portion of data is transmitted while the rest is regarded as thinned-out data and is not transmitted.

The arrangement according to this concept decreases the amount of data to be transmitted per unit time and thus permits the transmitted signal to be band compressed. The data thus transmitted is used by the receiving side for forming data corresponding to the thinned-out data. In other words, some interpolation data which is in proximity to the thinned-out data is obtained by computation by using the transmitted data. Since the interpolation data corresponds to a sparse part of the information signal, it is in close proximity to the thinned-out data. Compared with a case where the whole data is transmitted, the interpolating arrangement gives a restored signal with a fairly high degree of fidelity to the original signal while the transmission band can be reduced to a great degree by the arrangement. In other words, the amount of information to be transmitted is reduced by the arrangement.

Meanwhile, the elaborateness or fineness of the original signal within each of the divided blocks are examined in making a discrimination between transmitting the whole sampling data and transmitting just a portion thereof. Information on the result of this discrimination is also transmitted along with the transmitted data as transmission mode information.

In the case of image information, transmission according to the above-stated concept is performed in the following manner: The image information has a two-dimensional spread and has a correlativity between horizontal and vertical directions. Therefore, transmission of image information can be more effectively accomplished by arranging the intervals of sampling to be variable not only in the horizontal direction but also in the vertical direction. This idea will be called the two-dimensional TAT method. The following is the brief description of the two-dimensional TAT method:

FIG. 2 is a data transmission pattern of the two-dimensional TAT method. In this method, one picture plane is divided into a plurality of picture element blocks. Each of the divided blocks consists of an $m \times n$ number of picture elements. The transmitted data density of one picture element block is arranged to be variable from another and independently of another. In the case of FIG. 2, each picture element block consists of $4 \times 4$ picture elements and is arranged to be transmissible in two different transmission modes. In FIG. 2, each mark "" represents a picture element to be transmitted and another mark "X" a picture element to be thinned-out. A reference symbol E denotes a transmission pattern in which data of all the picture element is transmitted; and another symbol C a pattern in which only a portion of data of all the picture elements within one block is transmitted. Hereinafter, the mode of transmission in the former pattern will be called the E mode and transmission in the latter the C mode respectively. As apparent from the illustration, data is transmitted in the C mode with ¼ of the information transmitting density of the E mode. In the case of the C mode, the original image plane is restored by forming interpolating picture element data for each of the thinned-out picture elements on the basis of the transmitted data representing a picture element located near to the thinned-out one within the same picture element block. A system for carrying out the two-dimensional TAT method is arranged as described below with reference to FIG. 3:

FIG. 3 is a block diagram showing by way of example an analog transmission system. An incoming image signal is sampled for all the picture elements thereof by an analog-to-digital (hereinafter referred to A/D) converter 1. By this, data for all the picture elements is generated. This all-picture-element data is supplied to a thinning-out circuit 2. The thinning-out circuit 2 performs a thinning-out operation in a manner corresponding to the C mode pattern shown in FIG. 2. The circuit 2 thus produces C mode picture element data. The C mode picture element data is supplied to an interpolation circuit 3, which performs a computing operation to obtain interpolation picture element data corresponding to the thinned-out picture elements. The interpolation picture element data is supplied to a mode discrimination circuit 4 together with the all-picture-element data produced from the A/D converter 1. Then, each picture element block is determined whether it is to be transmitted in the C mode or in the E mode. At the mode discrimination circuit 4, computation is performed for each of the picture element blocks to obtain a difference between the picture element data produced from the A/D converter 1 and the interpolation picture element data. The sum of the difference (hereinafter referred to as a block distortion) is computed for every picture element block and then a total difference thus obtained for one field portion of the signal is stored in a memory.

Before arrival of the data of a next field, the distribution of block distortions of all the picture element blocks is thus obtained. In this instance, the ratio of the number of picture element blocks to be transmitted in the C mode to that of the picture element blocks to be transmitted in the E mode must be arranged to be unvarying to fix the rate of compression. For example, assuming that ⅔ of all the picture element blocks are to be transmitted in the C mode and ⅓ of these blocks to be transmitted in the E mode, a total number of transmission data (or the rate of compression) becomes ($\frac{2}{3} \times \frac{1}{4} + \frac{1}{3} \times 1 =)\frac{1}{2}$. Therefore, in accordance with the distribution of the block distortion covering all the picture element blocks, a threshold value of distortion is predetermined for determining a boundary between the C mode and the E mode.

Following this, at the time of arrival of the incoming image signal for the next field, the stored block distortion values are read out one after another and compared with the threshold value to determine thereby the transmission mode to be selected. In case that the read out distortion value coincides with the threshold value, the transmission mode is determined in such a manner that the number of the picture element blocks to be transmitted in the C mode and that of the blocks to be transmitted in the E mode are in the predetermined ratio. The mode discrimination circuit 4 produces a mode discrimination signal representing the determined transmission mode.

The mode discrimination signal which is thus obtained in the above-stated manner is supplied to a switch 7. Then, the picture element data is selectively read out from a buffer 5 which is provided for the picture element data of the E mode and a buffer 6 which is for the picture element data of the C mode. The output of the switch 7 is supplied as the transmission data to a digital-to-analog (D/A) converter 8 to be converted back into an analog picture element signal. This signal is then produced to a transmission line. Further, the mode discrimination signal is also produced to the transmission line via a buffer 9 as a mode information signal.

FIG. 4 shows in outline the arrangement of the receiving side of the two-dimensional TAT transmission system. The picture element signal which has been processed in the manner as described in the foregoing and supplied via the transmission line is received at an A/D converter 10 to be converted back into a digital picture element data. The output of the A/D converter 10 is supplied to a C mode interpolation circuit 11. The circuit 11 performs a computing operation to obtain interpolation data corresponding to the thinned-out picture element data in the C mode.

Meanwhile, the transmitted mode discrimination signal or mode information signal controls a switch 12. The connecting position of the switch 12 is shifted to its one side E when the signal indicates the E mode and to the other side C thereof when the signal indicates the C mode. Through this switch 12, the whole picture element data including the E mode picture element data, the C mode picture element data and the interpolation picture element data is stored gradually at a frame memory 13. The stored data is read out from the frame memory 13 in a sequence, for example, according to a television signal. The read out data is produced via a D/A converter 14 to become an image signal.

As described above, the image information can be effectively transmitted by the transmission system operating according to the two-dimensional TAT method. However, when a television signal which is obtained in the manner described above is displayed, deterioration becomes conspicuous in resolution in a still picture region although the resolution is acceptable in a motional picture region. Meanwhile, in the still region on the image plane, there is a high correlativity in the time axial direction. A method of utilizing this correlativity in the time axial direction has recently been advanced.

However, in the transmission system of the above-stated two-dimensional TAT method, image planes having temporal correlation among them are arranged to be continuously transmitted even for a still picture part having a high degree of temporal correlation without making any distinction between a still part and a motional part of each image plane during the continuous transmission of a temporally correlated group of image planes. Therefore, in the event of a still picture part having an extremely high degree of correlativity among image planes on the time base, transmission of similar image information signals are unnecessarily repeated many times. This results in a very poor transmission efficiency.

SUMMARY OF THE INVENTION

It is a general object of this invention to provide an image information transmitting system capable of solving the above-stated problems of the prior art.

It is a more specific object of this invention to provide an image information transmitting system which is arranged to transmit the information in a plurality of different information transmitting modes including a mode not transmitting a present image plane portion of the information and to transmit also information on the information transmitting modes in such a manner as to enhance the transmission efficiency of the transmitting system.

Under this object, an image information signal transmitting system arranged according to this invention as an embodiment thereof to transmit an image information signal, which continuously forms a temporally correlated group of image planes, comprises: dividing means for dividing each image plane portion of the incoming image information signal into a plurality of blocks; transmitting information signal forming means for forming, for each of the plurality of blocks obtained from the dividing means, a transmitting information signal on the basis of one of a plurality of different information transmitting modes of transmitting the information signal in different degrees of information density including a mode in which a present image plane portion of the image information signal is not transmitted; transmitting mode signal generating means for generating, for every one of the blocks, a transmitting mode signal which corresponds to the transmitting information signal formed by the transmitting information signal forming means and includes information on the use or nonuse of the information transmitting mode not transmitting the present image plane portion of the image information signal; and multiplexing means arranged to produce the transmitting information signal and the transmitting mode signal in a multiplexing manner.

It is another object of this invention to provide an image information transmitting system which is arranged to transmit the information in a plurality of different information transmitting modes including a mode not transmitting a present image plane portion of the information and to transmit also information on the information transmitting modes in such a manner as to transmit and reproduce an information signal with enhanced efficiency by suppressing deterioration of reproduced picture quality.

Under that object, an image information signal transmitting system arranged according to this invention as another embodiment thereof to transmit an image information signal, which continuously forms a temporally correlated group of image planes, comprises: A transmitting device including dividing means for dividing each image plane portion of the incoming image information signal into a plurality of blocks; transmitting information signal forming means for forming, for each of the plurality of blocks obtained from the dividing means, a transmitting information signal by selecting one of a plurality of different information transmitting modes of transmitting the information signal in different degrees of information density including a mode in which a present image plane portion of the image information signal is not transmitted; transmitting mode signal generating means for generating, for every one of said blocks, a transmitting mode signal which corresponds to the transmitting information signal formed by the transmitting information signal forming means and includes information on the use or nonuse of the information transmitting mode not transmitting the present image plane portion of the image information signal; and multiplex transmitting means arranged to transmit the transmitting information signal and the transmitting mode signal in a multiplexing manner, and a receiving device including separating means for separating the transmitting information signal and the transmitting mode signal received from the multiplex transmitting means from each other; and restoring means for restoring the image information signal from the transmitting information signal received in accordance with the transmitting mode signal separated by the separating means.

The above and other objects and features of the invention will become apparent from the following detailed description of embodiments thereof taken in connection with the accompanying drawings.

BRIEF DESCRIPTION OF THE DRAWINGS

FIG. 2 is an illustration of the data transmitting pattern of the two-dimensional TAT method.

FIG. 3 is a block diagram showing in outline the arrangement of the transmitter side of a transmission system embodying the two-dimensional TAT method.

FIG. 4 is a block diagram showing in outline the arrangement of the receiver side of the same transmission system.

DETAILED DESCRIPTION OF THE PREFERRED EMBODIMENTS

A transmission system described here as a first embodiment of this invention employs the two-dimensional TAT method mentioned in the foregoing and, in addition to that, is arranged to reduce the number of transmitting data by utlizing the temporal correlativity of the image information. The embodiment, therefore, may be called a three-dimensional TAT system. In the case of this three-dimensional TAT system, picture quality is arranged to be further increased with the same amount of data transmitted as in the case of the two-dimensional TAT method by taking the advantage of the fact that the receiver side of the system is not required to renew picture element data for the still or unmoving parts of the image planes. The basic concept of this embodiment is as follows: With regard to the picture element data included in a still picture part, once all the picture element data of an image plane is transmitted, the still picture element data block in the ensuing image planes is not transmitted in transmitting the ensuing image planes and the data transmitted is used repeatedly for the ensuing image planes. The transmitting mode in which the picture element data of an image plane previously transmitted is no longer transmitted and is thinned out hereinafter will be called the mode p. Further, for distinction from the two-dimensional TAT method, the transmitting modes which correspond to the modes E and C of the two-dimensional TAT method hereinafter will be called the modes e and c respectively.

In transmitting the same amount of data as in the case of the two-dimensional TAT method, the arrangement to increase the number of picture element blocks to be transmitted in the mode p enables high information density picture element blocks among the remaining picture element blocks be transmitted in the mode e. Therefore, on the side of the signal receiver, the number of picture element blocks giving a high degree of resolution can be increased according as the still picture area increases. This permit further improvement in the reproduced picture quality.

Figure 1:
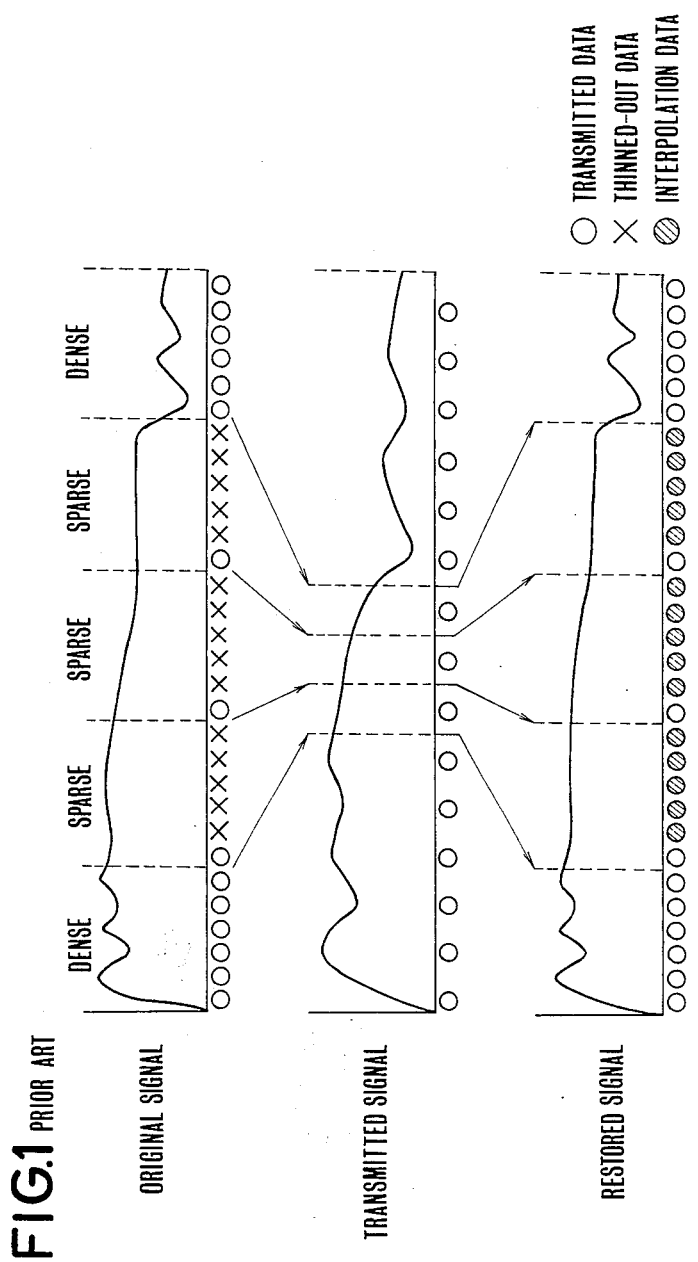
FIG. 1 is an illustration of the basic concept of the TAT method.
Figure 5:
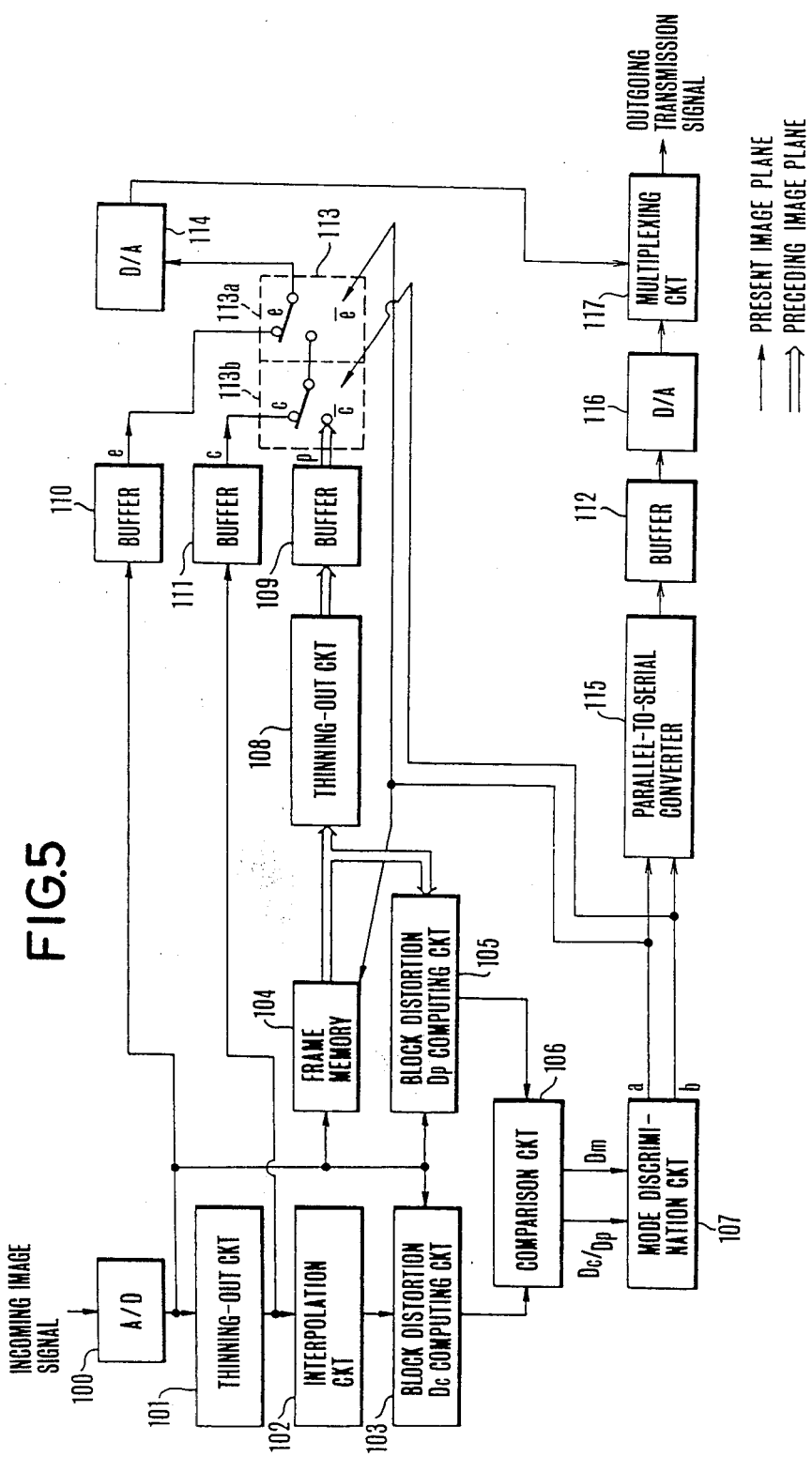
FIG. 5 is a block diagram showing in outline the arrangement of the transmitter side of a transmission system arranged as a first embodiment of this invention.

FIG. 5 shows in outline the arrangement of the transmitter of a transmission system arranged as the first embodiment of this invention. In this case, the invention is applied to an analog transmission system. In FIG. 5, the data of a preceding image plane is indicated by double lines and that of a present image plane by a single line. An incoming analog image or video signal is converted into a digital signal by an analog-to-digital converter 100 (hereinafter referred to as A/D converter). By this, the whole picture element data is produced. Like in the case of the two-dimensional TAT method, the whole picture element data is supplied to a thinning-out or skipping circuit 101. The circuit 101 performs a thinning-out process corresponding to the C mode pattern. By this process, picture element data in the mode c, i.e. basic picture element data, is obtained. The mode c picture element data is supplied to an interpolation circuit 102, which performs a computing operation for obtaining interpolating picture element data corresponding to the skipped or thinned out data.

A process of determining one of the three modes e, c and p to be employed in transmitting each picture element block is arranged to be performed as follows: The process can be roughly divided into two stages. In the first stage, a difference in the reproduced picture element data between the mode e transmission and the mode c transmission is computed by using the output of the A/D converter 100 and the output of the interpolation circuit 102 in the same manner as in the case of the two-dimensional TAT method. A total of this difference for each picture element block (hereinafter referred to as block distortion Dc) is then computed by a block distortion Dc computing circuit 103. Meanwhile, a difference between each picture element data of a previously transmitted image plane stored at a frame memory 104 and that of the present image plane is computed. A total of this difference for every picture element block (hereinafter referred to as block distortion Dp is likewise computed by a block distortion Dp computing circuit 105. Then, the block distortion Dc and the block distortion Dp are compared by a comparator 106.

In other words, the comparator 106 detects, for every picture element block, which of the mode c transmission and the mode p transmission is capable of reproducing an image plane with better fidelity relative to an image plane reproducible by mode e transmission. In the case of Dc>Dp, the mode c is not employed. The mode p is not employed in the case of Dc<Dp. The comparator 106 produces data (Dc/Dp) indicative of which of the distortion values Dc and Dp is larger and, along with it, also supplies information on the smaller value as a composite block distortion Dm to a mode discrimination circuit 107.

In the second stage, the mode e is allocated at the mode discrimination circuit 107 to a predetermined number of picture element blocks one after another in the order of larger Dm value. In the same manner as in the case of the two-dimensional TAT method, this allocation or assigning process is carried out in the following manner: A threshold value of the composite block distortion Dm is first obtained on the basis of the distribution of the distortion Dm among all the picture element blocks. The mode e is assigned to the picture element blocks having higher values of Dm than the threshold value. The modes other than the mode e are assigned when the value Dm is smaller than the threshold value. With the value Dm not exceeding the threshold value, the mode c is assigned if Dp>Dc and the mode p if Dp<Dc.

The mode discrimination circuit 107 thus assigns one of the modes e, c and p to each of the picture element blocks as applicable. The circuit 107 then produces in two bits a mode information signal representing the mode assigned. For example, the mode information signal is produced as "11" for the mode e; as "00" for the mode c; and as "01" for the mode p. Further, the higher order bit of the two bits is produced from the terminal a of the circuit 107 while the lower of the two bits is produced from the terminal b of the circuit 107. This specific embodiment is arranged to transmit the basic picture element data also for the picture element blocks allocated to the mode p for the purpose of retaining interchangeability with the two dimensional TAT method.

More specifically, the whole picture element data of the previous image plane is stored at the frame memory 104. The stored data is subjected to a thinning-out process which is carried out by a thinning out circuit 108 in the same manner as the thinning-out circuit 101 in such a manner as to obtain the basic picture element data.

The picture element data thus generated on the basis of these modes are stored respectively at buffers 109, 110 and 111. A switch 113 is arranged to selectively supply the mode p picture element data, the mode e picture element data or the mode c picture element data from the buffer 109, 110 or 111 to a digital-to-analog (D/A) converter 114. The switch 113 consists of switches 113a and 113b which are arranged to operate under the control of the mode information data produced from the above-stated mode discrimination circuit 107. The connecting position of the switch 113a shifts to one side e̅ thereof when data of "1" is produced from the terminal a of the mode discrimination circuit 107. The connecting position of the switch 113b shifts to one side c thereof when data of "1" is produced from the terminal b of the mode discrimination circuit 107. The switch 113b shifts to the other side c̅ when data of "0" is produced from the terminal b.

The terminals a and b of the mode discrimination circuit 107 produce two-bit data in parallel with each other. Therefore, the picture element data corresponding to the mode information data can be supplied from the buffer 109, 110 or 111 to the D/A converter 114.

The mode information data is converted by a parallel-to-serial converter 115 from the state of parallel data of two bits into the state of serial data of two bits. The serial data thus obtained is supplied via another buffer 112 to a D/A converter 116 to be made into an analog mode information signal.

The picture element signals and the mode information signal which are converted into analog signals respectively by D/A converters 114 and 116 are frequency multiplexed by a multiplexing circuit 117 into an outgoing transmission signal.

Figure 6:
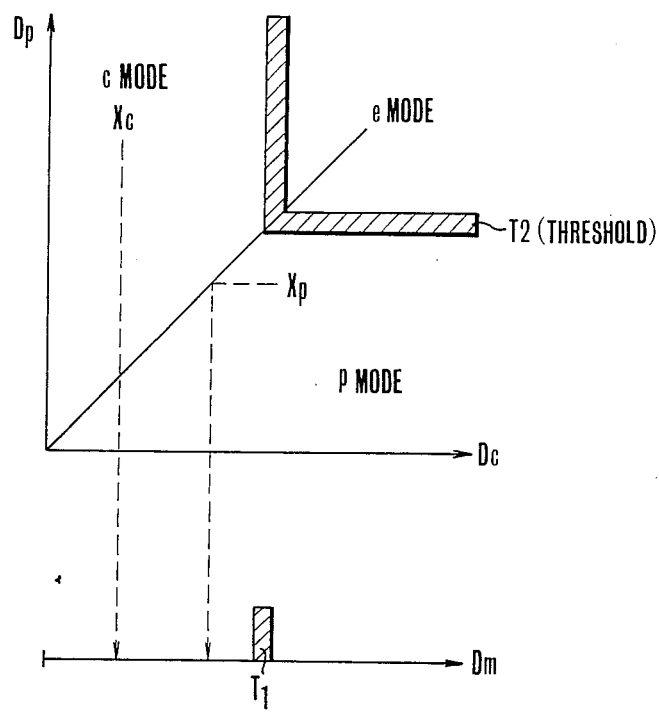
FIG. 6 is an illustration of mode allocation in relation to block distortions Dp and Dc.
Figure 7:
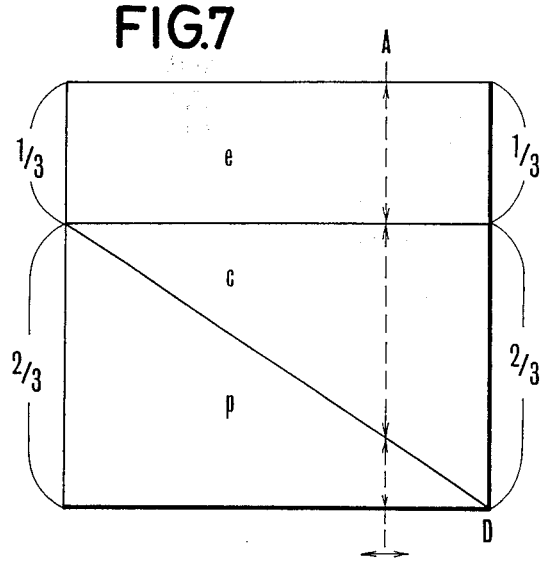
FIG. 7 is an illustration of changes taking place in a mode allocating ratio according to the state of the image.

The details of the mode allocating ratio determining arrangement of the above-stated embodiment are as follows: FIG. 6 shows mode allocation in relation to the block distortions Dp and Dc. FIG. 7 shows variations in the allocating ratio taking place according to the state of the image to be transmitted.

Referring to FIG. 6, the distortion Dp of the picture element block becomes larger according as the motion of the image increases. Meanwhile the distortion Dc of the picture element block increases according as the part having a high degree fineness increases. In other words, a block that two-dimensionally has a high frequency has a larger value of the distortion Dc. Further, the data Dm is the value of one of the distortions Dc and Dp having a smaller value between them. Therefore, the data Dm of a picture element block having the distortions Dc and Dp at a point Xc is obtained by drawing a line perpendicularly to an axis Dc as shown in FIG. 6. The data Dm of another picture element block having the distortions Dc and Dp at another point Xp is obtained on the axis Dc by drawing a line perpendicularly to an axis Dp from the point Xp and by further drawing a line from an intersection between this perpendicular line and a line Dc=Dp perpendicularly to the axis Dc. Assuming that a threshold value T1 is located on an axis Dm, as shown in FIG. 6, a threshold value T2 is located on the coordinates Dc and Dp as shown in FIG. 6. The region of the mode e is thus determined. In other words, the picture element blocks having a high degree of fineness and showing active motions are by and large transmitted in the mode e.

FIG. 7 shows the ratio in which each of the modes is assigned or allocated on the assumption that the total data compressing rate of each image plane is set at ½. In this case, the amount of picture element data to be transmitted in the mode p is ⅜ of the whole data and is assumed to be equal to that of picture element data to be transmitted in the mode c. Therefore, the number of picture element blocks which can be transmitted in the mode e is always ⅝ of the total number of the blocks of each image plane. In FIG. 7, a part D indicates the allocating ratio according to the two-dimensional TAT method. In other words, if there is no correlativity between the preceding and ensuing image planes in the three-dimensional TAT transmission system, these blocks are processed in the same manner as in the case of the two-dimensional TAT method. However, in transmitting completely still image planes, the number of picture element blocks to be transmitted in the mode c decreases and the same degree of resolution is obtained as in the case of transmitting all the picture element blocks in the mode e. In FIG. 7, the mode allocating ratio for an image plane is shown by the length of line segments defined by points on a broken line A at which the line A intersects regions e, c and p representing the modes e, c and p. The position of the broken line A depends, as apparent from the description given in the foregoing, on the temporal correlativity of the image information to be transmitted.

Figure 8:
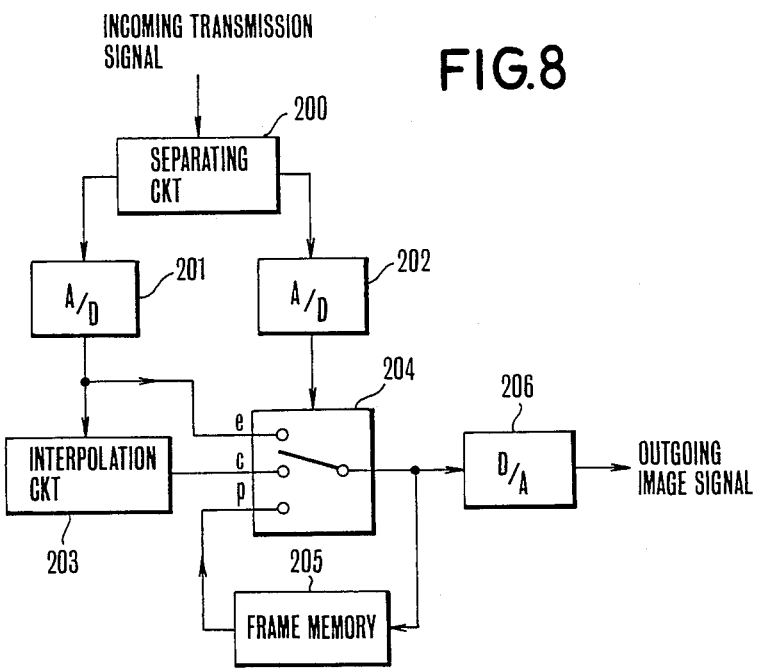
FIG. 8 is a block diagram showing in outline the arrangement of the receiver side of the transmission system arranged as the first embodiment of this invention.

FIG. 8 shows in outline the arrangement of the receiving side of the transmitting system embodying this invention as the same embodiment thereof. The analog picture element signal transmitted from the transmitter side as shown in FIG. 5 is received at a separating circuit 200 to be frequency separated into an analog picture element signal and an analog mode information signal. These analog signals are then converted into digital picture element data and digital mode information data respectively by A/D converters 201 and 202.

The mode information data produced from the A/D converter 202 controls the switching action of a switch 204. The connecting position of the switch 204 is shifted to one side e thereof when the mode information data represents the mode e. The picture element data produced from the A/D converter 201 is then allowed to be supplied as it is to a D/A converter 206. When the mode information data represents the mode c, the position of the switch 204 is shifted to another side c thereof. Under this condition, the picture element data produced from the A/D converter 201 is interpolated by an interpolation circuit 203 with data computed from the transmitted picture element data in proximity to the picture element data which is skipped and not transmitted. The interpolated data is then supplied to the D/A converter 206 via the switch 204. If the mode information data represents the mode p, the position of the switch 204 is shifted to a side p thereof. Under that condition, the picture element data of a picture element block which corresponds to the mode information on the mode p block of present image plane is read out from a frame memory 205 which is arranged to store the picture element data of a preceding image plane. The picture element data thus read out is supplied via the switch 204 to the D/A converter 206.

Further, the picture element data thus obtained for the present image plane is supplied also to the frame memory 205 to renew the picture element data of the preceding image plane thereby. In this instance, the picture element blocks of the preceding image plane which have been allocated to the mode p may be arranged to be omitted from the renewing or rewriting process. The D/A converter 206 is arranged to convert the picture element data of the present image plane into an analog image signal and produces it as an outgoing image signal.

In the case of this embodiment, the mode information is obtained in the form of an analog signal and is arranged to be frequency multiplexed with the analog picture element signal for transmission through one and the same transmission line. This arrangement may be changed to have the mode information obtained in the form of a digital data and transmitted through a transmission line which is provided separately from the transmission line of the analog picture element signal.

Figure 9:
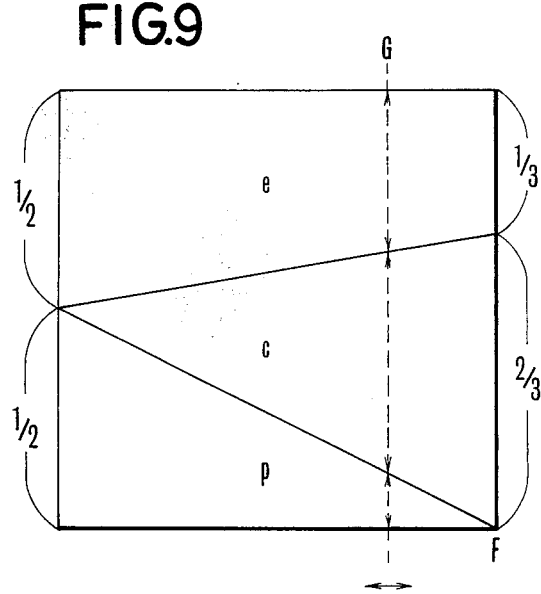
FIG. 9 is an illustration of changes taking place in the mode allocating ratio of another embodiment arranged not to transmit the basic picture element data in the case of a mode p.

Further, in the transmitting system of this embodiment, the basic picture element data which is equivalent to that of the mode c is arranged to be transmitted also for the mode p. This arrangement may be changed not to transmit the basic picture element data for the mode p. In that event, the mode assigning ratio among the modes varies as shown in FIG. 9 which is also on the assumption that the compressing rate is fixed at ½. As apparent from FIG. 9, if there is no correlation between temporally adjacent image planes, the transmitting process is performed in the same manner as in the case of the two-dimensional TAT method as indicated by a symbol F in the drawing. Further, the number of picture element blocks to be transmitted in the mode e increases according as the correlativity in the direction of the time base direction increases.

In continuously transmitting a temporally correlated image planes in accordance with this invention, there is provided a plurality of information transmitting modes including a mode in which information on a present image plane is not transmitted; and information on the information transmitting modes is also transmitted along with the image information. The invented arrangement enables the image information transmitting system to accomplish transmission with a high degree of efficiency.

What is claimed is:

1. An image information signal transmitting system for transmitting an image information signal which continuously forms temporally correlated image plane portions from an incoming image information signal, comprising:
    (a) dividing means for dividing each such image plane portion of said incoming image information signal into a plurality of blocks;
    (b) transmitting information signal forming means for forming, for each of said plurality of blocks obtained from said dividing means, a transmitting information signal on the basis of one of a plurality of different information transmitting modes of transmitting the information signal in different degrees of information density including a mode in which present image plane portion of said image information signal is not transmitted;
    (c) transmitting mode signal generating means for generating, for every one of said blocks, a transmitting mode signal which corresponds to the transmitting information signal formed by said transmitting information signal forming means and includes information on the use or nonuse of said information transmitting mode in which the present image plane portion of said image information signal is not transmitted; and
    (d) means arranged to transmit said transmitting information signal and said transmitting mode signal.

2. A system according to claim 1, wherein said means (d) is arranged to produce said transmitting information signal and said transmitting mode signal by multiplexing said signals together.

3. A system according to claim 1, wherein said transmitting information signal forming means includes:
(a) first transmitting means which is capable of transmitting said image information signal for each of said plurality of blocks obtained by said dividing means in a first degree of information density;
(b) second transmitting means which is capable of transmitting said image information signal for each of said plurality of blocks in a second degree of information density which is lower than said first degree of information density; and
(c) third transmitting means which is capable of transmitting, as said transmitting information signal, the image information signal of each of the plurality of blocks of an image plane preceding a present image plane by an n number (n: a positive integer) of image planes.

4. A system according to claim 3, wherein said transmitting mode signal generating means is arranged to select for each of said plurality of blocks one of said transmitting means for transmitting said image information signal and to generate a transmitting mode signal corresponding to said transmitting means selected.

5. A system according to claim 4, wherein said transmitting mode signal generating means is arranged to detect, for each of said plurality of blocks, the correlativity of the image information signal and to generate said transmitting mode signal according to the detected correlativity.

6. A system according to claim 2, wherein said image information signal consists of a plurality of picture element signals.

7. An image information signal transmitting system for transmitting an image information signal, comprising a plurality of picture element signals, which continuously forms temporally correlated image planes, comprising:
(a) dividing means for dividing each image plane portion of said incoming image information signal into a plurality of blocks;
(b) transmitting information signal forming means for forming, for each of said plurality of blocks obtained from said dividing means, a transmitting information signal on the basis of one of a plurality of different information transmitting modes of transmitting the information signal in different degrees of information density including a mode in which present image plane portion of said image information signal is not transmitted;
(c) transmitting mode signal generating means for generating, for every one of said blocks, a transmitting mode signal which corresponds to the transmitting information signal formed by said transmitting information signal forming means and includes information on the use or nonuse of said information transmitting mode not transmitting the present image plane portion of said image information signal; and
(d) multiplexing means arranged to produce the transmitting information signal and the transmitting mode signal in a multiplexing manner, said transmitting information signal forming means (b) including:
(1) first transmitting means which is capable of transmitting said image information signal for each of said plurality of blocks obtained by said dividing means in a first degree of information density;
(2) second transmitting means which is capable of transmitting said image information signal for each of said plurality of blocks obtained by said dividing means in a second degree of information density which is lower than said first degree of information density; and
(3) third transmitting means which is capable of transmitting, as said transmitting information signal, the image information signal of each of the plurality of blocks of an image plane preceding a present image plane by an n number (n):a positive integer) of image planes, said transmitting mode signal generating means (c) including:
(1) a thinning-out circuit arranged to perform an thinning-out process on said image information signal by skipping a predetermined number of said picture element signals;
(2) an interpolation circuit arranged to perform an interpolating process on said image information signal thinned out by said thinning-out circuit;
(3) a storage circuit arranged to store each of one-image-plane portions of said image information signal for an image plane already received preceding a present image plane by an n number of image planes and to be capable of producing the stored image plane portion of said image information signal into a plurality of blocks;
(4) A first correlativity data generating circuit arranged to generate, for each of said plurality of blocks, first correlativity data corresponding to the temporal correlativity of image planes by using the image information signal of the present image plane obtained from said dividing means and the image plane signal of the image plane which precedes the present image plane by the n number of image planes and is stored at said storage circuit;
(5) a second correlativity data generating circuit arranged to generate, for each of said plurality of blocks, second correlativity data corresponding to the spatial correlativity of the present image plane by using the image information signal of the present image plane obtained from said interpolation circuit; and
(6) a transmitting mode determining circuit arranged to produce a transmitting mode signal according to said first and second correlativity data.

8. A system for transmitting an image information signal which continuously forms temporally correlated image plane portions from an incoming image information for signal, comprising:
(A) a transmitting device including
(a) dividing means for dividing each such image plane portion of said incoming image information signal into a plurality of blocks;
(b) transmitting information signal forming means for forming, for each of said plurality of blocks obtained from said dividing means, a transmitting information signal by selecting one of a plurality of different information transmitting modes of transmitting the information signal in different degrees of information density including a mode in which a present image plane portion of said image information signal is not transmitted;

(c) transmitting mode signal generating means for generating, for every one of said blocks, a transmitting mode signal which corresponds to said transmitting information signal formed by said transmitting information signal forming means and includes information on the use or nonuse of said information transmitting mode in which the present image plane portion of said image information signal is not transmitted; and (d) transmitting means for transmitting said information signal and said transmitting mode signal, and (b) a receiving device including (e) separating means for separating said transmitting information signal and said transmitting mode signal received from said transmitting means from each other; and (f) restoring means for restoring said image information signal from said transmitting information signal received in accordance with said transmitting mode signal separated by said separating means.

9. A system according to claim 8, wherein said transmitting signal forming means includes:

(a) first transmitting means arranged to be capable of transmitting, as said transmitting information signal for each of said plurality of blocks obtained from said dividing means, said image information signal in a first degree of information density;

(b) second transmitting means arranged to be capable of transmitting, as said transmitting information signal for each of said plurality of blocks obtained from said dividing means, said image information signal in a second degree of information density which is lower than said first degree of information density; and (c) third transmitting means which is capable of transmitting, as said transmitting information signal, said image information signal for each of said plurality of blocks of an image plane preceding a present image plane by an n number (n: a positive integer) of image plane.

10. A system according to claim 9, wherein said transmitting mode signal generating means is arranged to detect, for each of said plurality of blocks obtained from said dividing means, the correlativity of said image information signal; and to generate said transmitting mode signal by selecting, for each of said plurality of blocks, one of said first, second or third transmitting means as applicable for transmitting said image information signal in accordance with the correlativity detected; and to generate said transmitting mode signal accordingly.

11. A system according to claim 10, wherein said restoring means includes:

(a) interpolating means arranged to perform an interpolating process on said image information signal transmitted in said second degree of information density by the second transmitting means and then to produce an interpolated signal; and (b) storing means arranged to be capable of storing one image plane portion of said image information signal for a restored previous image plane.

12. A system according to claim 11, wherein said restoring means is arranged to have said interpolating means perform said interpolating process when said transmitting mode signal separated by said separating means indicates a second transmitting mode; and to restore a present image plane portion of said image information signal by using a previous image plane portion of said image information signal stored at said storing means when said transmitting mode signal indicates use of a third transmitting mode.

13. A system for transmitting image information signals which comprise a plurality of picture element information signals and at the same time continuously form a group of temporally correlated image planes, comprising:

(a) dividing means for dividing each image plane portion of said image information signals comprising a plurality of picture element information signals into a plurality of blocks;

(b) transmitting information signal forming means for forming, for each of said plurality of blocks obtained from said dividing means, a transmitting information signal on the basis of one of a plurality of different information transmitting modes of transmitting the information signal in different degrees of information density including a mode in which present image plane portion of said image information signal is not transmitted;

(c) transmitting mode signal generating means for generating, for every one of said blocks, a transmitting mode signal which corresponds to the transmitting information signal formed by said transmitting information signal forming means and includes information on the use or nonuse of said information transmitting mode not transmitting the present image plane portion of said image information signal;

(d) multiplexing means arranged to produce the transmitting information signal and the transmitting mode signal in a multiplexing manner; and (e) thinning-out means for performing a process of thinning out such predetermined number of picture elements information signals as correspond to said second transmitting density out of the plurality of picture element information signals constituting each one of the plurality of blocks obtained by said dividing means.

* * * * *

UNITED STATES PATENT AND TRADEMARK OFFICE
CERTIFICATE OF CORRECTION

PATENT NO. : 4,755,878
DATED : July 5, 1988
INVENTOR(S) : Tadayoshi Nakayama et al It is certified that error appears in the above-identified patent and that said Letters Patent is hereby corrected as shown below:

Col 2, line 15    Change (" ") to --"O"--

Col 3, line 3     Change "7/8" to --1/3--

Col 3, line 6     Change "7/8" to --1/3--

Col 6, line 41    Change "permit" to --permits--

Col 9, line 3     Change "7/8" to --1/3--

Col 11, line 30   Change "2" to --3--

Col 12, line 15   Change "an" to --a--

Col 13, line 14   Change "(b)" to --(B)--

Signed and Sealed this

Eleventh Day of October, 1988

Attest:

DONALD J. QUIGG

*Attesting Officer*    *Commissioner of Patents and Trademarks*